United States Patent
Wahl et al.

(10) Patent No.: US 10,821,970 B2
(45) Date of Patent: Nov. 3, 2020

(54) METHOD FOR AUTOMATICALLY ADJUSTING THE SPEED OF A MOTORCYCLE DURING A TURNING MANEUVER

(71) Applicant: Robert Bosch GmbH, Stuttgart (DE)

(72) Inventors: Anja Wahl, Markgroeningen (DE); Florian Mayer, Ditzingen (DE); Horst Jung, Fellbach (DE); Markus Henzler, Stuttgart (DE); Matthias Klews, Tübingen (DE); Uwe Wostradowski, Weil der Stadt-Merklingen (DE)

(73) Assignee: Robert Bosch GmbH, Stuttgart (DE)

( * ) Notice: Subject to any disclaimer, the term of this patent is extended or adjusted under 35 U.S.C. 154(b) by 111 days.

(21) Appl. No.: 16/229,416

(22) Filed: Dec. 21, 2018

(65) Prior Publication Data

US 2019/0210592 A1 Jul. 11, 2019

(30) Foreign Application Priority Data

Jan. 11, 2018 (DE) .......................... 10 2018 200 406

(51) Int. Cl.
*B60W 30/045* (2012.01)

(52) U.S. Cl.
CPC ....... *B60W 30/045* (2013.01); *B60W 2300/36* (2013.01); *B60W 2520/18* (2013.01); *B60W 2540/18* (2013.01); *B60W 2720/18* (2013.01)

(58) Field of Classification Search
CPC ........... B60W 30/045; B60W 2300/36; B60W 2520/18; B60W 2540/18; B60W 2720/18; B60W 2720/10; B60W 10/18; B60W 30/02; B60W 30/18145; B60W 30/146; B60W 10/06
USPC .......................................................... 701/70
See application file for complete search history.

(56) References Cited

U.S. PATENT DOCUMENTS

| | | | | |
|---|---|---|---|---|
| 2009/0265058 A1* | 10/2009 | Hasegawa | ............... | F02D 29/02 701/31.4 |
| 2015/0314781 A1* | 11/2015 | Klews | ................... | B60W 10/04 701/71 |
| 2016/0368546 A1* | 12/2016 | Wahl | ..................... | B60W 30/04 |

* cited by examiner

*Primary Examiner* — Muhammad Shafi
(74) *Attorney, Agent, or Firm* — Norton Rose Fulbright US LLP; Gerard Messina

(57) ABSTRACT

In a method for the automatic adjustment of the speed of a motorcycle during a turning maneuver, the current position of incline of the motorcycle is determined and is compared with a target position of incline, the speed being reduced or increased as a function of the difference.

14 Claims, 1 Drawing Sheet

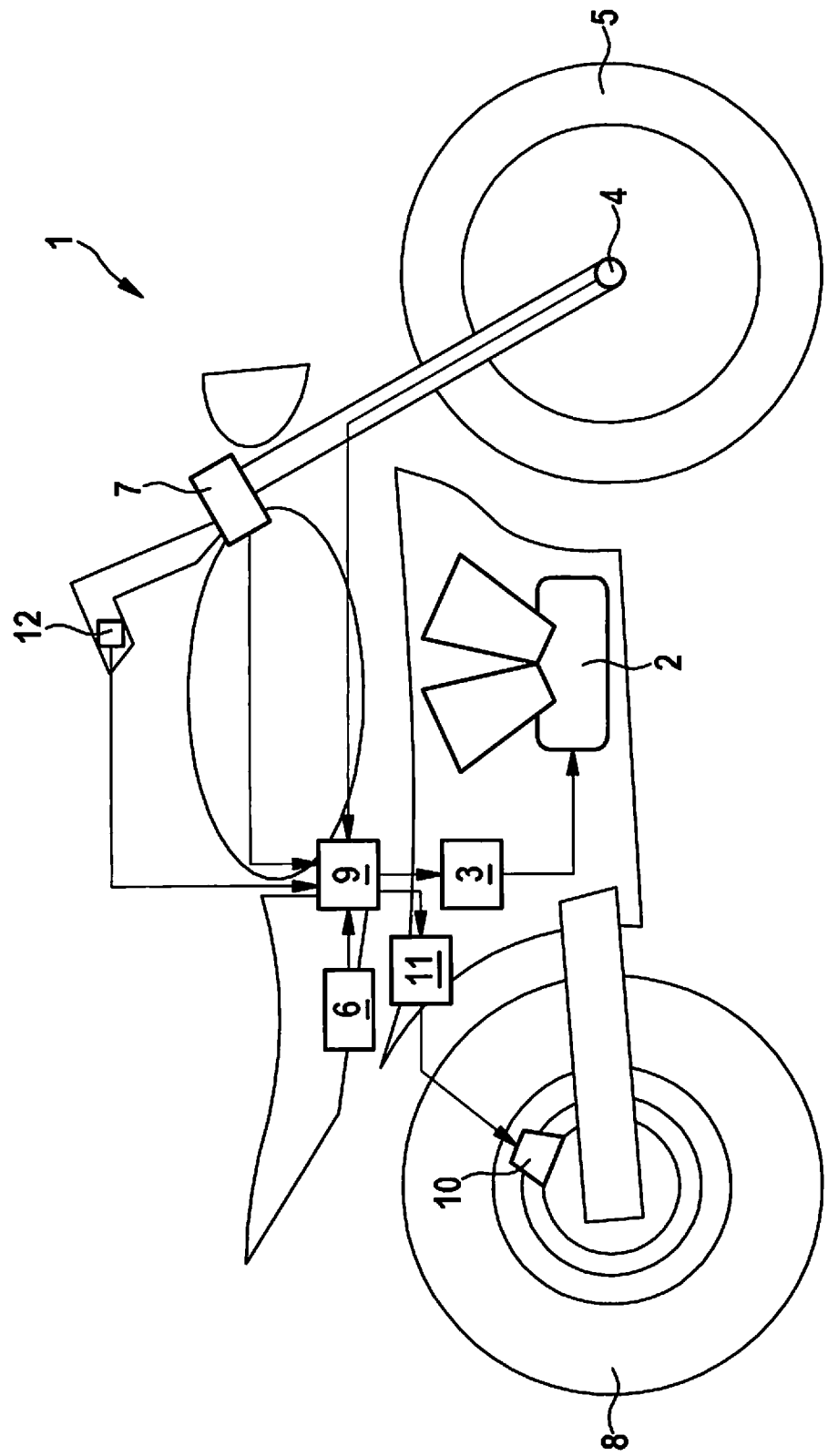

METHOD FOR AUTOMATICALLY ADJUSTING THE SPEED OF A MOTORCYCLE DURING A TURNING MANEUVER

CROSS-REFERENCE TO RELATED APPLICATIONS

The present application claims priority under 35 U.S.C. § 119 to DE 10 2018 200 406.4, filed in the Federal Republic of Germany on Jan. 11, 2018, the content of which is hereby incorporated by reference herein in its entirety.

FIELD OF THE INVENTION

The present invention relates to a method for the automatic adjustment of the speed of a motorcycle during a turning maneuver.

BACKGROUND

It is known that the driving stability of motorcycles increases as the speed increases. Due to the gyroscopic effect of the wheels, at high speeds motorcycles are in an inherently stable position, starting from which the driver has to change the position of incline through steering inputs in order to introduce travel along a curved path. At lower speeds, in contrast, the driver continuously has to make self-regulating interventions in order to prevent the motorcycle from tipping over. In particular, during a turning maneuver where the steering bar is at a steering stop so as to realize as small a turning radius as possible, there is the danger that tilting of the motorcycle towards the inside of the curve can no longer be compensated by active steering in the curve direction. In this case, the driver can counteract the tilting towards the inside of the curve only by increasing the speed, and thus bringing about a greater centrifugal force. However, if the motorcycle straightens up too far, then either the motorcycle speed has to be reduced by braking or the steering angle has to be reduced, thus departing from the smallest turning radius. For these reasons, a turning maneuver having the smallest possible radius places high demands on the driver.

SUMMARY

Using the support method according to the present invention, the driver of the motorcycle can be supported when carrying out a turning maneuver, and driving stability can be ensured. In order to carry out the support method during a turning maneuver having a large steering angle, the current position of incline of the motorcycle is continuously determined from sensor data and is compared to a target position of incline, and the speed of the motorcycle is regulated as a function of the difference of the current position of incline and the target position of incline. In this way, an automatic intervention is made in a device of the motorcycle by which the speed can be changed, namely either an automatic braking intervention or an automatic acceleration intervention. Correspondingly, in order to reduce the difference between the current position of incline and the target position of incline, the motorcycle speed is automatically adapted either by reducing the speed through the automatic braking intervention or increasing the speed through the automatic acceleration intervention, depending on the direction of the deviation of the current position of incline from the target position of incline.

If the current position of incline exceeds a critical value, then a higher engine torque can be requested in order to increase the speed and, given a constant steering angle, to also bring about a greater centrifugal force, so that the motorcycle again becomes upright. Here, it can be necessary for the drive torque acting on the rear wheel to be metered by an electronic clutch, and to carry out the turning maneuver with a slipping clutch.

If, on the other hand, the position of incline is below a critical value, then the motorcycle is too upright, or is tending too strongly in that direction. In this case, using the support method, an active braking intervention is carried out at a wheel brake by building up a brake pressure. As a result, the motorcycle speed is reduced, causing the centrifugal force also to become smaller, and the position of incline again increases. Overall, in this way a stabilization of the motorcycle during a turning maneuver is achieved. The stabilizing measures are carried out automatically and without active intervention by the driver.

The turning maneuver is characterized by a large steering angle in the motorcycle. Advantageously, the method is carried out only if the steering angle is a minimum steering angle that is in particular at least in the vicinity of a steering stop and thus in the vicinity of the maximum possible steering angle, regardless of the direction of the steering intervention. Thus, it can for example be useful to carry out the support method only when the steering bar is at the left or right steering stop, so that the steering angle, or the magnitude of the steering angle, is at its maximum. However, it can be sufficient if the steering angle has not reached the maximum possible value, but is at least at a steering angle boundary value close to the maximum steering intervention.

After the support function is activated, the current position of incline of the motorcycle is continuously compared with the target position of incline. The target position of incline is preferably determined as a function of the speed selected by the driver. The driver introduces the turning maneuver through manual interventions, and, with the introduction of the turning maneuver, determines the speed, the steering angle, and the position of incline of the motorcycle. Starting from the selected speed and the selected steering angle when the turning maneuver is introduced, an associated target position of incline can be defined. In general, the target position of incline can be determined as a function of the speed, and there is in addition a functional dependence of the position of incline on the steering angle. Given a known steering angle and known speed, an unambiguous value for the target position of incline thus results.

During the carrying out of the turning maneuver with activated support function for the automatic adjustment of the speed of the motorcycle, the steering angle can be held constant by the driver, in particular at the steering stop. However, the method also functions when the steering angle is not constant, for example when there are fluctuations of the steering angle about an average value, or when there is a steering back starting from the maximum steering intervention. When there is a change of the current steering angle, the target position of incline is also newly ascertained and defined. The determination of the current steering angle and the defining of the target position of incline preferably take place continuously while the support function is activated.

The current position of incline is ascertained on the basis of current sensor data acquired in the motorcycle using a provided sensor system. The sensor system is for example an inertial sensor system that ascertains accelerations and rates of rotation in the longitudinal, transverse, and vertical direction. In addition, the sensor system includes the ascertaining of the rotational speeds of the front wheel and/or of the rear wheel of the motorcycle. If necessary, in addition a steering angle sensor can be provided in order to ascertain the current steering angle.

In addition or alternatively to a steering angle sensor, in order to carry out the method it can also be adequate to provide a sensing device at the left and right steering stop of the motorcycle, capable of detecting that the steering bar of the motorcycle has been engaged so far that it has reached the left or right steering stop. In principle, this information is sufficient for recognizing a correspondingly large steering angle as a precondition for activating and carrying out the method.

Finally, it is also possible, given knowledge of the current angle of the inclined position, to ascertain the current steering angle from a kinetic relationship taking into account the angle of incline, the wheel rotational speed, the vehicle speed, and the spacing between the front and rear wheel of the motorcycle.

Advantageously, the rear wheel brake of the motorcycle is controlled so as to automatically reduce the speed of the motorcycle during the support method. The actuation of only the rear wheel brake ensures that no undesirable righting moments are produced by braking forces, as would be the case during a braking maneuver via an actuation of the front wheel brake.

The support function can be started in various ways. According to an example embodiment, the start of the support function takes place when requested by the driver. The driver has the possibility of starting the support function for example via a switch, whereupon the automatic speed regulation for stabilizing the motorcycle is activated.

It is advantageous for the support function to be started only when defined preconditions are met. These preconditions include, for one, that the steering angle or magnitude of the steering angle is a minimum steering angle, and in addition that the speed set by the driver does not exceed a maximum speed. These preconditions relate to the presence of a turning maneuver with a large steering angle and simultaneous low speed. Advantageously, the support function is started only when the named boundary values are maintained.

Alternatively to a manual starting of the support function, it is also possible for the support function to start automatically. Via the sensor system, it can be recognized that the preconditions, with regard to speed and steering angle, for the presence of a turning maneuver are met, whereupon the support function is automatically started.

According to an example embodiment, the support function is ended when the steering angle, or the magnitude of the steering angle, falls below a steering angle boundary value. In this case, the steering angle is too small to carry out a turning maneuver, whereupon the method for supporting and stabilizing the motorcycle during a turning maneuver is automatically terminated. For the case as well in which the speed specified by the driver is below a speed boundary value, the support function can be automatically terminated; this is for example the case when the driver brings the motorcycle to a standstill.

Finally, it is also possible to terminate the supporting of the turning maneuver if the driver actively terminates the support function via a corresponding switch.

In addition, the present invention relates to a control device of the motorcycle with which the various method steps of the support function for automatically adjusting the speed of the motorcycle during a turning maneuver are carried out. In the control device, items of sensor information from a sensor system installed in the vehicle are processed, and actuating signals are produced for controlling a motorcycle brake and for controlling a drive engine in the motorcycle. Here it can be useful for the control device to communicate with further control devices in the motorcycle, for example with a brake control device and with an engine control device. In addition, it is also possible for the control device for processing sensor information and for producing actuating signals for a brake intervention and an acceleration intervention to be integrated into a control device that is already present, for example a brake control device or an engine control device.

An example embodiment of the present invention is directed to a motorcycle turning maneuver support system designed to carry out the method described above with the support function. The motorcycle turning maneuver support system includes a sensor system installed in the motorcycle for ascertaining accelerations and wheel rotational speeds, for example an inertial sensor system, and a control device as described above for carrying out the method, in which the sensor data are processed and actuating signals are produced for controlling the brake and the engine.

Further advantages and useful embodiments can be gleaned from the claims, drawing, and the description thereof, which describe a motorcycle equipped with a motorcycle turning maneuver support system.

BRIEF DESCRIPTION OF THE DRAWING

The FIGURE shows a motorcycle according to an example embodiment of the present invention.

DETAILED DESCRIPTION

The FIGURE shows a motorcycle 1 that has an engine 2 for driving a rear wheel and an engine control device 3 for controlling engine 2. Motorcycle 1 is equipped with a sensor system that includes a wheel rotational speed sensor 4 at the front wheel 5 and an inertial sensor system 6 and a steering angle sensor 7 via which the current steering angle specified via the steering bar of the motorcycle is detected. Via inertial sensor system 6, the longitudinal, transverse, and vertical acceleration in motorcycle 1 can be acquired. Advantageously, a rotational speed sensor is also situated at rear wheel 8.

Motorcycle 1 is equipped with a motorcycle turning maneuver support system that includes a further control device 9 to which sensor data from the sensor system in the motorcycle, in particular the wheel rotational speed sensors and the steering angle sensor, and the accelerations from the inertial sensor system, are supplied as input quantities. In control device 9, on the basis of the acquired sensor data, actuating signals are produced that, when the motorcycle turning maneuver support system is activated during a turning maneuver having a large steering angle and low speed, automatically bring about a braking intervention or an acceleration intervention in order to stabilize the motorcycle during the turning maneuver. The braking intervention, carried out automatically by the motorcycle turning maneuver support system, relates to a rear wheel brake 10 to which a brake or ABS control device 11 is assigned. Control device 9 of the motorcycle turning maneuver support system communicates with brake control device 11 and with engine control device 3 in order to automatically influence the speed of the motorcycle by braking or acceleration, in order to stabilize the motorcycle during the turning maneuver.

In addition, motorcycle 1 is equipped with a trigger switch 12 that enables the driver of the motorcycle to manually initiate a support method for the automatic adjustment of the speed of the motorcycle during a turning maneuver.

The support function of the method is based on the ascertaining of a target position of incline $\varphi_s$, which is determined as a function of the motorcycle speed v and the selected steering angle δ when the turning maneuver is introduced. The target position of incline $\varphi_s$ is stored in control device 9 as a function or table.

In addition, the execution of the method for the automatic adjustment of the speed during a turning maneuver is based on the current position of incline y of the motorcycle, ascertained in particular from kinetic quantities in the motorcycle, preferably from the acceleration quantities of the longitudinal, transverse, and/or vertical acceleration, as well as one or more wheel rotational speeds ω at front wheel 5 and/or at rear wheel 8. After the start of the method for the automatic adjustment of the speed during a turning maneuver, the current position of incline φ of the motorcycle is continuously determined and compared with the assigned target position of incline $\varphi_s$. If the comparison yields the result that the current position of incline exceeds a critical value, and the motorcycle is thus inclined too far during a turning maneuver, control device 9 requests a higher engine torque from engine control device 3, and the speed of the motorcycle is increased. This increases the centrifugal force, causing the motorcycle to move towards an upright position.

It can be advantageous, depending on the engine characteristic and gas consumption, to meter the engine torque acting on the rear wheel via an electronic clutch, and to carry out the turning maneuver with a slipping clutch.

If the comparison between the current position of incline y and the target position of incline $\varphi_s$ yields the result that the current angle of incline is too small, indicating that the motorcycle is too upright, then brake pressure is requested at brake control device 11 via a control device 9, and a corresponding brake pressure is built up at rear wheel brake 10. As a result, the motorcycle speed is reduced, causing the centrifugal force to become smaller, and causing the incline of the position to increase again.

Regulation times are chosen to be short enough that movements of the driver can be compensated.

The support function is activated in particular manually by the driver via an actuation of trigger switch 12. For manual activation, a basic precondition is that the motorcycle speed does not exceed a speed boundary value and that the steering angle, or the magnitude of the steering angle, exceeds a steering angle boundary value. The steering angle boundary value can be selected such that an activation of the support function is carried out only when there is a maximum steering intervention.

The current steering angle δ is advantageously ascertained via steering angle sensor 7.

Alternatively, steering angle δ can also be ascertained from the equation:

$$\delta = \arctan\left[\frac{l}{v} \cdot \omega \cdot \cos\varphi\right],$$

where:
l is the wheel spacing between the front and rear wheels,
v is the motorcycle speed,
ω is the wheel rotational speed,
φ is the position of incline, and
δ is the current steering angle.

In this way it is possible to determine the current steering angle from motorcycle geometric quantities as well as current kinetic quantities of the position of incline, the wheel rotational speed, and the motorcycle speed.

The support function can be terminated if a termination criterion is met, for example if the steering angle is below a steering angle boundary value or the speed specified by the driver is below a speed boundary value. In addition, it is possible for the driver to manually terminate the support function by correspondingly actuating trigger switch 12.

What is claimed is:

1. A method for automatic adjustment of a speed of a motorcycle during a turning maneuver, the method comprising:
    continuously performing, via a control device, the following:
        determining from sensor data a current position of incline of the motorcycle;
        comparing the determined current position of incline to a target position of incline to determine a difference between the current position of incline and the target position of incline; and
        changing, when a result of the comparing indicates a difference between the current position of the incline and the target position of the incline, the speed of the motorcycle based on the determined difference, wherein the changing includes increasing the speed via an automatic acceleration intervention or reducing the speed via an automatic braking intervention;
    wherein the automatic adjustment is terminated in response to one of the following: (i) a steering angle reaching below a minimum threshold value, (ii) a value of the speed specified by the driver being below a minimum threshold value, or (iii) a driver actively terminating the automatic adjustment.

2. The method of claim 1, further comprising:
    determining the target position of the incline as a function of a value of the speed selected by a driver.

3. The method of claim 2, further comprising:
    determining the target position of the incline as a function of a value of the speed selected by the driver when the turning maneuver is introduced.

4. The method of claim 1, wherein the sensor data based on which the current position of the incline is determined includes sensor data regarding at least one of accelerations, rates of rotation, and wheel rotational speeds.

5. The method of claim 1, wherein the continuous performance of the determining, comparing, and changing for the automatic adjustment of the speed of the motorcycle is performed only if a steering angle of the motorcycle is at least a minimum threshold steering angle.

6. The method of claim 1, wherein the automatic braking intervention is carried out only at a rear wheel of the motorcycle.

7. The method of claim 1, wherein the automatic adjustment is performed in response to a value of a steering angle of the vehicle being at least a minimum threshold value and a value of the speed, which is selected by a driver, not exceeding a maximum threshold value.

8. The method of claim 1, wherein the automatic adjustment is terminated in response to the steering angle reaching below the minimum threshold value.

9. The method of claim 1, wherein the automatic adjustment is terminated in response to the value of the speed specified by the driver being below the minimum threshold value.

10. The method of claim 1, wherein the automatic adjustment is terminated in response to the driver actively terminating the automatic adjustment.

11. A method for automatic adjustment of a speed of a motorcycle during a turning maneuver, the method comprising:
continuously performing, via a control device, the following:
determining from sensor data a current position of incline of the motorcycle;
comparing the determined current position of incline to a target position of incline to determine a difference between the current position of incline and the target position of incline; and
changing, when a result of the comparing indicates a difference between the current position of the incline and the target position of the incline, the speed of the motorcycle based on the determined difference, wherein the changing includes increasing the speed via an automatic acceleration intervention or reducing the speed via an automatic braking intervention;
wherein the continuous performance of the determining, comparing, and changing for the automatic adjustment of the speed of the motorcycle is performed only if a steering angle of the motorcycle is at least a minimum threshold steering angle, and
wherein the steering angle is at least the minimum threshold steering when the steering angle is approximately at a steering stop.

12. A method for automatic adjustment of a speed of a motorcycle during a turning maneuver, the method comprising:
continuously performing, via a control device, the following:
determining from sensor data a current position of incline of the motorcycle;
comparing the determined current position of incline to a target position of incline to determine a difference between the current position of incline and the target position of incline; and
changing, when a result of the comparing indicates a difference between the current position of the incline and the target position of the incline, the speed of the motorcycle based on the determined difference, wherein the changing includes increasing the speed via an automatic acceleration intervention or reducing the speed via an automatic braking intervention;
wherein the automatic adjustment is performed in response to a user request for maneuver support.

13. A device for a motorcycle, comprising:
a control device having a processor; and
an interface to interface a brake system and a drive engine of the motorcycle;
wherein the control device is configured for automatically adjusting a speed of the motorcycle during a turning maneuver and is configured to perform:
determine, from sensor data, a current position of an incline of the motorcycle;
compare the determined current position of the incline to a target position of incline; and
change, when a result of the comparing indicates a difference between the current position of the incline and the target position of the incline, the speed of the motorcycle based on the determined difference, wherein the changing includes controlling: (a) the drive engine, via the interface, to increase the speed with an automatic acceleration intervention, or controlling (b) the brake system, via the interface, to reduce the speed via an automatic braking intervention;
wherein the automatic adjustment is terminated in response to one of the following: (i) a steering angle reaching below a minimum threshold value, (ii) a value of the speed specified by the driver being below a minimum threshold value, or (iii) a driver actively terminating the automatic adjustment.

14. A system of a motorcycle, comprising:
a sensor system for ascertaining at least one of accelerations, rates of rotation, and wheel rotational speeds;
a control device having a processor; and
an interface to interface the processor to a brake system and a drive engine of the motorcycle;
wherein the control device is configured for automatically adjusting a speed of the motorcycle during a turning maneuver and is configured to perform:
determine, from sensor data of the sensor system, a current position of an incline of the motorcycle;
compare the determined current position of the incline to a target position of incline; and
change, when a result of the comparing indicates a difference between the current position of the incline and the target position of incline, the speed of the motorcycle based on the determined difference, wherein the changing includes controlling: (a) the drive engine, via the interface, to increase the speed with an automatic acceleration intervention, or (b) the brake system, via the interface, to reduce the speed via an automatic braking intervention;
wherein the automatic adjustment is terminated in response to one of the following: (i) a steering angle reaching below a minimum threshold value, (ii) a value of the speed specified by the driver being below a minimum threshold value, or (iii) a driver actively terminating the automatic adjustment.

* * * * *